Dec. 12, 1961     G. TRIPPE     3,013,145
BIRD REPELLENT LIGHT

Filed Sept. 21, 1959     2 Sheets-Sheet 1

INVENTOR.
Graham Trippe,
BY James R. McKnight
Attorney.

Dec. 12, 1961 G. TRIPPE 3,013,145
BIRD REPELLENT LIGHT
Filed Sept. 21, 1959 2 Sheets-Sheet 2
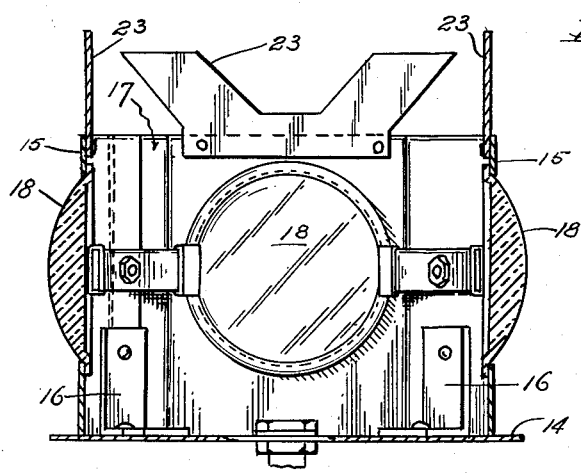
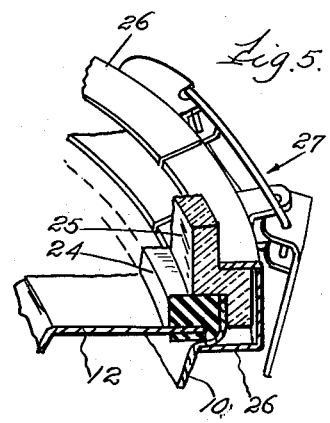
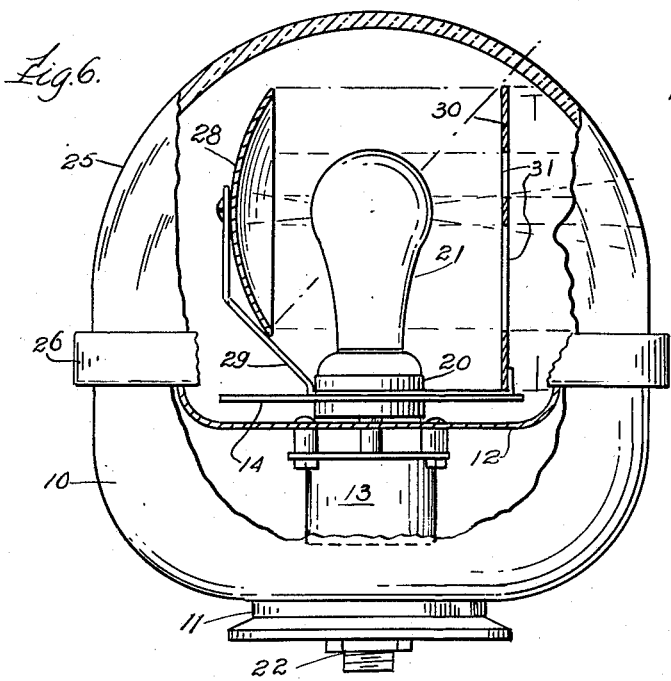
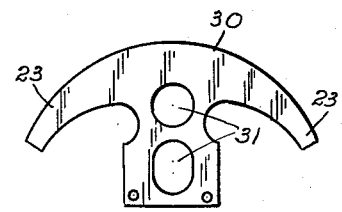
INVENTOR.
Graham Trippe.
BY James R. McKnight
Attorney.

3,013,145
Patented Dec. 12, 1961

3,013,145
BIRD REPELLENT LIGHT
Graham Trippe, Chicago, Ill., assignor to Trippe Manufacturing Company, Chicago, Ill., a corporation of Illinois
Filed Sept. 21, 1959, Ser. No. 841,086
1 Claim. (Cl. 240—49)

My invention relates to a light for protecting a warehouse or the like from unwanted birds, and for harmlessly discouraging their entry into, and encouraging their departure from, the premises.

Birds fly into warehouses, factories and other buildings and cause damage to goods housed therein and to the premises, which totals millions of dollars annually. The object of my invention is to provide a light which will repel such unwanted birds, prevent their entry and expedite their departure from the premises. My light will not hurt the birds or offend the sensitivities of animal lovers, but will economically and consistently solve the problem of repelling unwanted and destructive birds in the interiors of buildings.

In some instances birds will nest within a building and bring their young for added nuisance. Nesting ceases under the rapid and incessant rays of the alternating beams of flashing lights and the bird-like shadow effects of my device.

My light may also be accompanied by supersonic sound as a further bird repelling means.

My invention also comprises such other objects, advantages and capabilities as will later more fully appear, and which are inherently possessed by my invention.

While I have shown in the accompanying drawings preferred embodiments of my invention, yet it is to be understood that the same is susceptible of modification and change without departing from the spirit of my invention.

Figure 1:
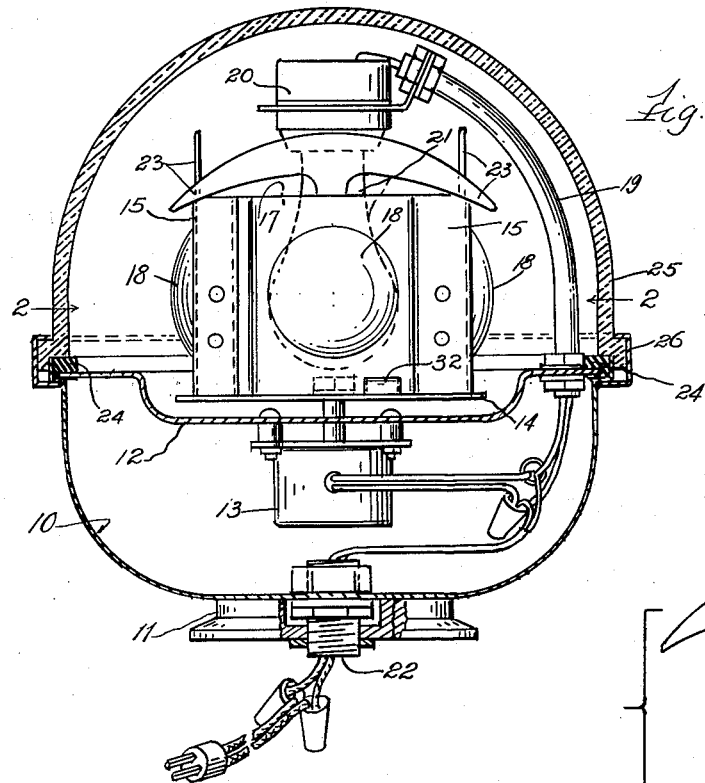
Figure 3:
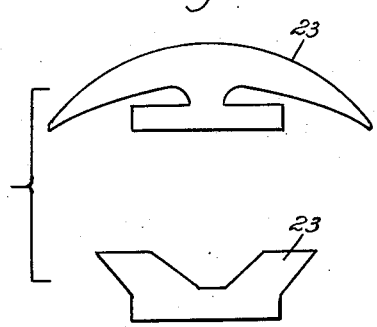
Figure 2:
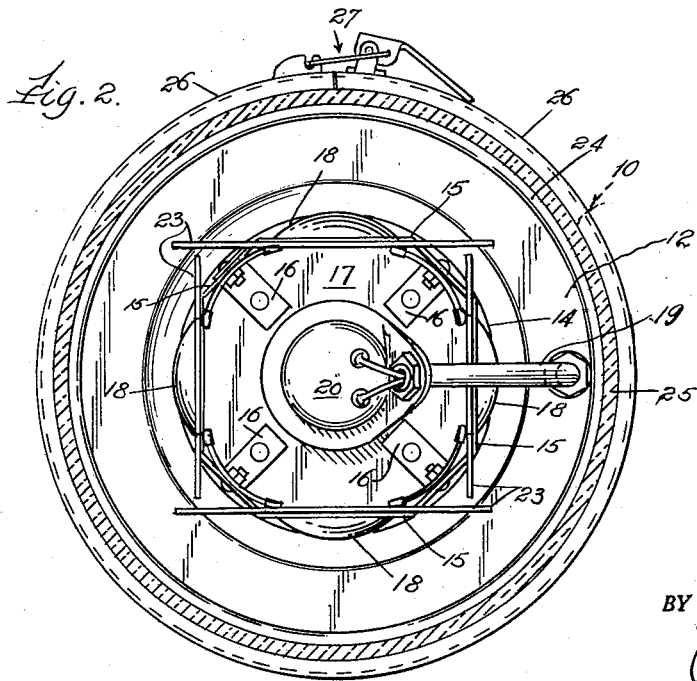

Referring to the drawings, FIG. 1 is a vertical elevational view, partly in section of my preferred embodiment; FIG. 2 is a top plan view on line 2—2 of FIG. 1; FIG. 3 is a grouped face view of my wing shaped members; FIG. 4 is an enlarged vertical view partly in section of the turntable and lens arrangement; FIG. 5 is an enlarged perspective view, partly in section of the clamping means; FIG. 6 is a vertical view partly broken away to show a modified form of my device, and FIG. 7 is a face view of the modified wing member.

The embodiment selected to illustrate my invention comprises a base housing 10 having a bottom base member 11. A supporting plate 12 is mounted within and to said base housing 10. A motor 13 is positioned under said plate 12 and is attached thereto. Rotatably mounted on plate 12 is turntable 14. Vertical walls 15 are attached to turntable 14 by straps 16 and form a cage with an open top 17. A plurality of spaced lenses 18 are mounted in walls 15. A curved tube 19 mounted on and extending through plate 12 extends upwardly and inwardly over the open top 17 of cage 15, and supports socket 20 to receive electric light bulb 21. Wires lead from said sockets 20 through tube 19 and extend through opening 22 in base portion 11 to an electrical source of supply. Other wires lead from motor 13 through opening 22 to an electrical source of supply for actuating motor 13.

Adjacent the tops of walls 15 are attached a plurality of wing shaped members 23 which extend above said walls.

A washer 24 is attached to the outer margin of plate 12 to support the edges of transparent dome 25 of plastic, glass or other suitable material. A clamping ring 26 extends around the beaded edges of base housing 10 and dome 25 and has a detachable fastener 27.

In operation when the wires are plugged into an electric socket, the electricity actuates motor 13 and lights bulb 21. The motor 13 rotates or oscillates turntable 14 so that the lens 18 projects light beams from bulb 21. The lens 18 may be alternately clear and colored such as amber to further vary the light patterns. In addition, the wings 23 at the tops of walls 15 provide varying and configurated shadows, simulating birds in flight.

The combination of movable light beams of varying intensity, in addition to the changing and configurated shadows, provide disturbing and repelling rays and images that will discourage the entry or continued presence of birds without physical harm to them and encourage the prompt and desired leaving of the premises.

The light rays and shadows of my device disturb the nesting and feeding habits of birds who have made homes for their young on the premises. Such disturbing of the birds and their young is so critical that it encourages their departure.

In a slightly different embodiment of my invention, I may provide instead of cage 15, a reflector 28, mounted on a support 29 on turntable 14. Opposite reflector 28 is baffle 30 also mounted on turntable 14 and having desired openings 31 and a wing like portion 23. Instead of tube 19 with its light holding construction, I may provide a socket 20, mounted on turntable 14, said socket to receive electric light bulb 21. Socket 20 is of course connected with suitable wires to an electrical source of supply.

In those enclosures where there are areas not readily reached by rays and shadows, I may also provide a sound emitting means 32 in the supersonic range between 11,000 and 13,000 vibrations per minute. Such sound emitting means is actuated by the operation of motor 13. The sound, not audible by human ears, will be heard by the birds and in combination with the light rays and shadows expedite their departure.

Having thus described my invention, I claim:

A bird repellent light for warehouses, and other large industrial enclosed premises comprising a base housing, a supporting plate attached to said housing, a motor positioned within said housing below said supporting plate and attached to said supporting plate, a turntable rotatably mounted on said supporting plate, and connected with said motor, a light socket mounted on said supporting plate, an electric light bulb positioned in said socket, an open topped cage mounted on said turntable and around said light, a plurality of lens mounted on said cage, a plurality of wing like members in silhouette attached to and extending above the top of said cage, electric means connecting said socket with an electrical source of supply for providing light for said electric light bulb, and electric means connecting said motor with an electrical source of supply for activating said motor and rotating said turntable so that as the wing shaped members rotate in the light from said electric light bulb, they will cast shadows that flap up and down like the wings of birds in flight for the repelling of unwanted birds on the premises.

References Cited in the file of this patent
UNITED STATES PATENTS

| | | |
|---|---|---|
| 1,124,334 | Salzer | Jan. 12, 1915 |
| 1,486,731 | Cook | Mar. 11, 1924 |
| 2,268,476 | Duncan | Dec. 30, 1941 |
| 2,361,497 | Porter | Oct. 31, 1944 |
| 2,398,974 | Storm | Apr. 23, 1946 |
| 2,571,640 | Willman | Oct. 16, 1951 |
| 2,719,282 | Roth | Sept. 27, 1955 |
| 2,721,256 | Duhon | Oct. 18, 1955 |
| 2,730,067 | Schaufler | Jan. 10, 1956 |
| 2,913,572 | Fritzlen | Nov. 17, 1959 |